(12) United States Patent
D'Haene

(10) Patent No.: US 9,266,307 B2
(45) Date of Patent: Feb. 23, 2016

(54) HEATED MULTIPLE LAYER GLAZINGS

(75) Inventor: Pol D'Haene, Kessel-Lo (BE)

(73) Assignee: Solutia Inc., St. Louis, MO (US)

( * ) Notice: Subject to any disclaimer, the term of this patent is extended or adjusted under 35 U.S.C. 154(b) by 2282 days.

(21) Appl. No.: 12/208,301

(22) Filed: Sep. 10, 2008

(65) Prior Publication Data

US 2010/0059495 A1 Mar. 11, 2010

(51) Int. Cl.
*B60L 1/02* (2006.01)
*H05B 3/06* (2006.01)
*B32B 17/10* (2006.01)
*B32B 15/02* (2006.01)
*B32B 15/20* (2006.01)
*B32B 27/30* (2006.01)
*B32B 27/36* (2006.01)
*H05B 3/84* (2006.01)

(52) U.S. Cl.
CPC .......... *B32B 17/10761* (2013.01); *B32B 15/02* (2013.01); *B32B 15/20* (2013.01); *B32B 17/10* (2013.01); *B32B 17/10018* (2013.01); *B32B 17/10036* (2013.01); *B32B 17/10376* (2013.01); *B32B 17/10688* (2013.01); *B32B 27/30* (2013.01); *B32B 27/36* (2013.01); *H05B 3/84* (2013.01); *H05B 2203/002* (2013.01); *Y10T 428/24802* (2015.01)

(58) Field of Classification Search
CPC .... B32B 17/10; B32B 2367/00; B32B 15/02; B32B 15/20; B32B 17/10018; B32B 17/10036; B32B 17/10376; B32B 17/10688; B32B 17/10761; B32B 27/30; B32B 27/36; H05B 2203/002; H05B 3/84; Y10T 428/248
USPC .......... 219/203, 522, 538, 541–549
See application file for complete search history.

(56) References Cited

U.S. PATENT DOCUMENTS

| | | | |
|---|---|---|---|
| 4,102,722 A * | 7/1978 | Shoop | 156/99 |
| 4,166,876 A | 9/1979 | Chiba | |
| 4,413,877 A | 11/1983 | Suzuki | |
| 4,782,216 A | 11/1988 | Woodard | |
| 4,786,783 A | 11/1988 | Woodard | |
| 5,091,258 A | 2/1992 | Moran | |
| 6,541,744 B2 * | 4/2003 | Von Arx et al. | 219/544 |
| 7,026,018 B2 | 4/2006 | Kranovich | |
| 7,129,444 B2 * | 10/2006 | Weiss | 219/203 |
| 2003/0146199 A1 | 8/2003 | Sol | |
| 2005/0238887 A1 | 10/2005 | D'Errico | |
| 2005/0252908 A1 | 11/2005 | Weiss | |
| 2006/0096967 A1 | 5/2006 | Weiss | |
| 2006/0196865 A1 | 9/2006 | Weiss | |
| 2007/0020465 A1 * | 1/2007 | Thiel et al. | 428/428 |
| 2007/0044542 A1 * | 3/2007 | Barguirdjian et al. | 73/73 |
| 2008/0028697 A1 | 2/2008 | Li | |
| 2008/0166563 A1 * | 7/2008 | Brittingham et al. | 428/411.1 |

* cited by examiner

*Primary Examiner* — Sang Y Paik
(74) *Attorney, Agent, or Firm* — Michelle Bugbee

(57) ABSTRACT

The present invention provides interlayers that comprise a polymer film onto which micro lines have been formed from a conductive material. The interlayers comprising such films can be incorporated, for example, into a two glass pane multiple layer glazing. Such glazings can be used, for example, in automobile windscreens or rear window applications or other applications that require a heated glazing panel.

19 Claims, 2 Drawing Sheets

HEATED MULTIPLE LAYER GLAZINGS

FIELD OF THE INVENTION

The present invention is, generally, in the field of laminated glass, and, specifically, the present invention is in the field of laminated glass that is used for rear window defogging and similar applications in which an electric current is passed through the laminated glass panel.

BACKGROUND

Poly(vinyl butyral) (PVB) is commonly used in the manufacture of polymer layers that can be used as interlayers in light-transmitting laminates such as safety glass or polymeric laminates. Safety glass often refers to a transparent laminate comprising a poly(vinyl butyral) layer disposed between two layers of glass. Safety glass often is used to provide a transparent barrier in architectural and automotive openings. Its main function is to absorb energy, such as that caused by a blow from an object, without allowing penetration through the opening or the dispersion of shards of glass, thus minimizing damage or injury to the objects or persons within an enclosed area. Safety glass also can be used to provide other beneficial effects, such as to attenuate acoustic noise, reduce UV and/or IR light transmission, and/or enhance the appearance and aesthetic appeal of window openings.

In automobiles and some architectural applications of multiple layer laminated safety glass, or multiple layer glazings, there exists a desire to heat the glass, to, for example, allow for the defrosting of the glass. Such defrosting can be accomplished by, for example, using Tungsten or Wolfram wires stitched onto a polymer layer that is then laminated between two layers of glass to form a rear window. Another conventional approach uses a very thin metal layer applied to glass in a laminated glass assembly. In either case, an electrical potential is applied across the conductor and the resistance to the resultant current produces heat.

While the above-cited methods are effective at defrosting the multiple layer glazing in which the conductive components are included, they can present difficulties in manufacture. Further, defrosters exposed to the environment, such as surface-applied conductive lines on a glass laminate, can be mechanically damaged, resulting in loss of function. Conventional defrosters, as described above, also tend to either provide less functionality than desired or a greater degree of visual contamination than desired.

What are needed in the art are improved multiple layer glazing constructs that provide easy and inexpensive fabrication and that provide ready defrosting or heating in the finished application.

SUMMARY OF THE INVENTION

The present invention provides interlayers that comprise a polymer film onto which micro lines have been formed from a conductive material. The interlayers comprising such films can be incorporated, for example, into a two glass pane multiple layer glazing. Such glazings can be used, for example, in automobile windscreens or rear window applications or other applications that require a heated glazing panel.

DETAILED DESCRIPTION

Figure 2:
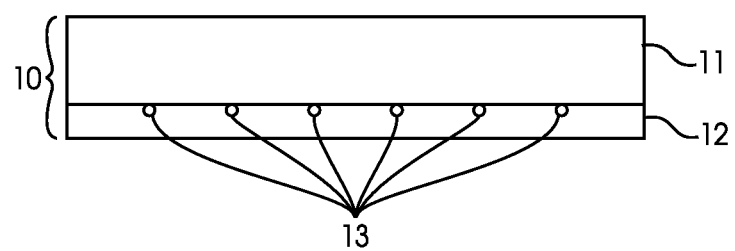
FIG. 2 is a cross-sectional view of one embodiment of a heatable multiple layer glazing interlayer which includes a polymer layer and a polymer file with electrically conductive micro lines.

The present invention is directed to interlayers for use in multiple layer glazings such as laminated safety glass. As shown in FIG. 2, interlayers (10) of the present invention comprise at least one polymer layer (11) and at least one polymer film (12) that together form part or all of the interlayer (10). As will be described in greater detail elsewhere herein, polymer layers (11) and polymer films (12) can comprise any suitable material, and, in a typical example, polymer layers (11) comprise poly(vinyl butyral) and polymer films (12) comprise poly(ethylene terephthalate).

As also shown in FIG. 2, interlayers, (10) of the present invention comprise at least one polymer film (12) that comprises electrically conductive micro lines (13). Unlike conventional applications in which, for example, tungsten wires are "stitched" directly into a poly(vinyl butyral) layer, interlayers (10) of the present invention advantageously utilize an additional polymer film (12), such as a polyester, as the conductor carrying element of the interlayer (10). The use of a film (11) allows for excellent control over the process of forming the conductor and a wide range of conductor designs and materials.

As used herein, "micro lines" of the present invention are lines that have a thickness of less than 100 microns. In various embodiments, the micro lines are from 5 to 100 microns, 5 to 50 microns, or 5 to 25 microns. In preferred embodiments, micro lines of the present invention have a thickness of 5 to 50 microns, 5 to 25 microns, or 5 to 15 microns. In preferred embodiments, micro lines are less than 20 microns, or are 5 to 15 or 10 to 14 microns.

Micro lines of the present invention can be applied in any suitable pattern to the polymer film substrate. Examples include straight lines that are formed in parallel to one another and grids that are formed by two or more sets of parallel lines that are formed in non-parallel orientations.

Micro lines of the present invention that are formed in parallel straight lines can be formed on the polymer film at any suitable distance from each other that achieves the dual desirable characteristics of low or no visual contamination and sufficient heating capacity. In various embodiments, parallel straight lines can be formed in a regular spaced pattern with a distance of 150 microns to 1,000 microns, 200 microns to 1,000 microns, or preferably 300 microns to 1,000 microns between the lines. In other embodiments, parallel spaced straight lines can be set at non-repeating distances from each other and, as such, form a more random pattern, as desired for the intended application.

Micro lines of the present invention that are formed in a grid pattern can comprise two sets of parallel lines that are offset to each other so as to form a grid of squares or rhombuses, or other quadrilaterals, including patterns in which more than a single, repeating shape is formed by the intersection of the two sets of lines. In embodiments in which repeating squares are formed, squares can have sides of length of 150 microns to 1,000 microns or 300 microns to 1,000 microns. In embodiments in which a repeating rhombus shape is formed, the rhombus can have sides of length 150 microns to 1,000 microns and acute angles of 45° or greater. In some cases the repeating units do not have to be regular, but the micro lines are preferably interconnected in order to assure a sufficient and optimal conductivity of the metallic grid through which current can pass in an uninterrupted way. In various embodiments micro lines are formed in a non-regular squared pattern.

Micro lines of the present invention can be formed from any suitable conductor, including, for example, without limitation, copper, gold, silver, aluminum, platinum, and alloys and combinations of the foregoing. In a preferred embodiment, the grid comprises copper and/or silver. In various embodiments of the present invention, micro lines comprise carbon nanotubes.

Micro lines of the present invention can be formed using any suitable method, and, in various embodiments, micro lines of the present invention are formed using photolithography (see, for example, U.S. Pat. Nos. 6,207,266; 6,197,408; 6,733,869), inkjet printing of conductive inks (see, for example, U.S. Patent Publication 2006278853), screen printing of conductive pastes (see, for example, U.S. Patent Publication 2007211536), applying coatings (see, for example, U.S. Patent Publication 20077022226), or using development techniques used in traditional photography (based on selectively exposing silver salt emulsions) (see, for example, JP2006228836; JP 2006228478; U.S. 2005214693; and WO 03007672).

Micro lines of the present invention can be applied to one or both sides of a polymer film layer of the present invention, and, in embodiments in which more than one polymer film is used in a single interlayer, micro lines can be formed on one or both sides of either or both polymer films.

In various embodiments of the present invention, micro lines of the present invention are formed at a thickness and pattern that result in the finished polymer film having a sheet resistance ranging from 0.050 to 5.0 ohms per square depending on the technique used and the geometrical characteristics of the grid. Increasing the thickness and/or width of the micro lines results in a higher conductivity as well as in a higher mesh density. In various embodiments of the present invention, the surface resistivity is 0.050 to 3 ohms per square, 0.050 to 2 ohms per square, or 0.050 to 1 ohm per square. In preferred embodiments, polymer films of the present invention comprising micro lines can be used effectively in a 12 volt direct current system to provide acceptable defrosting of a window. In various embodiments, polymer films of the present invention, after disposition in a multiple layer glazing panel of the present invention, will, upon the application of 12 volts direct current, draw a current of 10 amps or higher, depending on the electrical properties of the structure and the geometrical configuration. Multiple layer glazing panels of the present invention are preferably operable in their capacity as defoggers in association with 12 volt direct current systems, although it will be recognized that other applications with greater or less voltage can be easily accommodated by the present invention.

In order to connect the micro lines of the present invention to a power source, two or more electrodes are provided. Electrodes can be solid conductors that are disposed in contact with, for example, an edge region of the micro line array. In preferred embodiments, a first electrode is disposed in contact with one edge of a micro line array and a second electrode is disposed in contact with the opposite edge of the micro line array, as in a rear window defroster. Electrodes can be, for example, thin wires or strips of any suitable conductor. In various embodiments, electrodes will be formed of the same material as the micro lines, and, in various embodiments, the electrodes are formed at the same time as the micro lines.

Sheet resistance is strongly determined by the surface coverage of the micro lines. Decreasing the surface coverage of the micro lines strongly increases the visible light transmission of the sheet, which, in various embodiments, is at least 75%, and preferably at least 80%.

In various embodiments of the present invention, an interlayer comprises a single polymer layer and a single polymer film. The polymer film in these embodiments is disposed in contact with the polymer layer, and the multiple layer interlayer can be laminated to a single pane of glass to form a bilayer or, with the use of an adhesive on the polymer film opposite the polymer layer, the multiple layer interlayer of these embodiments can be laminated between two panes of glass to form a multiple layer glazing panel having the configuration glass//polymer layer//polymer film//glass.

A bilayer formed according to the above can have the following typical configuration: glass//polymer layer//polymer film. In these types of embodiments, a hardcoat or other scratch resistance layer, as are known in the art, can be formed on the outside surface of the polymer film to provide protection from physical damage.

A two glass layer multiple layer glazing panel according to the above can also be formed having the following typical configuration: glass//polymer layer//polymer film//polymer layer//glass.

In further embodiments, an interlayer of the present invention can be used as a spall shield having the following construction: glazing panel//polymer layer//polymer film.

In further embodiments of the present invention, a second polymer film is bonded to the first polymer film with an adhesive, thereby forming a two layer polymer film construct. This type of construct will be useful, for example in embodiments in which additional functionality in the polymer film is desirable but where adding the additional functionality to the same polymer film on which the micro lines are formed is impractical. Further polymer films and other layers can also be added, where desired, to achieve various other effects and/or for ease of manufacture.

Polymer Films

As used herein, a "polymer film" means a relatively thin and rigid polymer layer that functions as a performance enhancing layer. Polymer films differ from polymer layers, as used herein, because polymer films do not themselves provide the necessary impact resistance and glass retention properties to a multiple layer glazing structure, but rather provide performance improvements, such as the electrical conduction described herein. Poly(ethylene terephthalate) is most commonly used as a polymer film.

Polymer films used in the present invention can be any suitable film that is sufficiently rigid to provide a relatively flat, stable surface, for example those polymer films conventionally used as a performance enhancing layer in multiple layer glass panels. The polymer film is preferably optically transparent (i.e. objects adjacent one side of the layer can be comfortably seen by the eye of a particular observer looking through the layer from the other side), and usually has a greater, in some embodiments significantly greater, tensile modulus, regardless of composition, than that of the adjacent polymer layer. In various embodiments, the polymer film comprises a thermoplastic material. Among thermoplastic materials having suitable properties are nylons, polyurethanes, acrylics, polycarbonates, poly(vinyl butyral), polyolefins such as polypropylene, cellulose acetates and triacetates, vinyl chloride polymers and copolymers, and the like. Poly(vinyl butyral), when used in the form of films, are stiffer and substantially thinner than poly(vinyl butyral) layers that have been formed for use as an interlayer for absorbing energy from a blow. In various embodiments, the polymer film comprises materials such as re-stretched thermoplastic films having the noted properties, which include polyesters. In various embodiments, the polymer film comprises or consists of poly(ethylene terephthalate), and, in various embodiments, the poly(ethylene terephthalate) has been biaxially stretched to improve strength, and/or has been heat stabilized to provide low shrinkage characteristics when subjected to elevated temperatures (e.g. less than 2% shrinkage in both directions after 30 minutes at 150° C.). In other embodiments, the polymer film comprises a polyimide.

In various embodiments, a polymer film can have a thickness of 0.013 millimeters to 0.25 millimeters, 0.025 millimeters to 0.1 millimeters, or 0.04 to 0.06 millimeters.

A polymer film can optionally be surface treated or coated with a functional performance layer to improve one or more properties, such as adhesion or infrared radiation reflection. These functional performance layers include, for example, a multi-layer stack for reflecting infra-red solar radiation and transmitting visible light when exposed to sunlight. This multi-layer stack is known in the art (see, for example, WO 88/01230 and U.S. Pat. No. 4,799,745) and can comprise, for example, one or more Angstroms-thick metal layers and one or more (for example, two) sequentially deposited, optically cooperating dielectric layers. Various coating and surface treatment techniques for poly(ethylene terephthalate) films and other polymer films that can be used with the present invention are disclosed in published European Application No. 0157030. Polymer films of the present invention can also include a hardcoat and/or an antifog layer, as are known in the art.

In various embodiments of the present invention, polymer films can be colored using conventionally known dyes and/or pigments.

Polymer Layers

As used herein, a "polymer layer" means any polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer layers.

The polymer layers of the present invention can comprise any suitable polymer, and, in one embodiment, as exemplified above, a polymer layer comprises poly(vinyl butyral). In other embodiments, a polymer layer comprises polyurethane. In any of the embodiments of the present invention given herein that comprise poly(vinyl butyral) as the polymeric component of the polymer layer, another embodiment is included in which the polymer component consists of or consists essentially of poly(vinyl butyral). In these embodiments, any of the variations in additives, including plasticizers, disclosed herein can be used with the polymer layer having a polymer consisting of or consisting essentially of poly(vinyl butyral).

In one embodiment, the polymer layer comprises a polymer based on partially acetalized poly(vinyl alcohol)s. In further embodiments the polymer layer comprises poly(vinyl butyral) and one or more other polymers. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful components in polymer layers.

For embodiments comprising poly(vinyl butyral), the poly(vinyl butyral) can be produced by any suitable method. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, $3^{rd}$ edition, Volume 8, pages 381-399, by B. E. Wade (2003) can be used. In another embodiment, the aqueous method described therein can be used. Poly(vinyl butyral) is commercially available in various forms from, for example, Solutia Inc., St. Louis, Mo. as Butvar™ resin.

In various embodiments, the resin used to form polymer layer comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The resin can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, for example, a 2-ethyl hexanal group (see, for example, U.S. Pat. No. 5,137,954).

In various embodiments, the polymer layer comprises poly(vinyl butyral) having a molecular weight of at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350,000 g/m (see, for example, U.S. Pat. Nos. 4,902,464; 4,874,814; 4,814,529; and 4,654,179). As used herein, the term "molecular weight" means the weight average molecular weight.

Various adhesion control agents can be used in polymer layers of the present invention, including sodium acetate, potassium acetate, and magnesium salts.

Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate) (chemical abstracts number 79992-76-0). In various embodiments of the present invention the magnesium salt is magnesium bis(2-ethyl butyrate).

In various embodiments of polymer layers of the present invention, the polymer layers can comprise 5 to 60, 25 to 60, 5 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) layer. In general, higher amounts of plasticizer are added to decrease the $T_g$. Poly(vinyl butyral) polymer layers of the present invention can have a $T_g$ of, for example, 40° C. or less, 35° C. or less, 30° C. or less, 25° C. or less, 20° C. or less, and 15° C. or less.

Any suitable plasticizers can be added to the polymer resins of the present invention in order to form the polymer layers. Plasticizers used in the polymer layers of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779 and $C_6$ to $C_8$ adipate esters, such as hexyl adipate. In various embodiments, the plasticizer used is dihexyl adipate and/or triethylene glycol di-2ethylhexanoate.

In various other embodiments of the present invention, polymer layers comprise a polymer selected from the group consisting of poly(vinyl butyral), polyurethane, polyvinyl chloride, poly(ethylene-co-vinyl acetate), polyethylene, polyethylene copolymers, partially neutralized ethylene/(meth)acrylic copolymers, combinations thereof, and the like.

Various embodiments include poly(ethylene-co-vinyl acetate) as described in U.S. Pat. Nos. 4,614,781, 5,415,909, 5,352,530, and 4,935,470. Various embodiments include polyurethane comprising, for example, aliphatic isocyanate polyether based polyurethane (available from Thermedics Polymer Products of Noveon Inc.). Other additives can be incorporated into the polyurethane resins during extrusion, such as ultraviolet stabilizers and functional chemicals to provide high adhesion to glass.

Polymeric resins can be thermally processed and configured into layer form according to methods known to those of ordinary skill in the art. As used herein, "resin" refers to the polymeric (for example poly(vinyl butyral) or poly(vinyl chloride)) component of a polymer composition. Resin will generally have other components in addition to the polymer, for example, components remaining from the polymerization process. As used herein, "melt" refers to a melted mixture of resin with a plasticizer, if required, and optionally other additives, for example, performance enhancing agents. One exemplary method of forming a poly(vinyl butyral) layer comprises extruding molten poly(vinyl butyral) comprising resin, plasticizer, and additives—the melt—by forcing the melt through a layer die (for example, a die having an opening that is substantially greater in one dimension than in a perpendicular dimension). Another exemplary method of forming a poly(vinyl butyral) layer comprises casting a melt from a die onto a roller, solidifying the resin, and subsequently removing the solidified resin as a layer.

Polymer layers can be produced through conventional coextrusion and extrusion coating processes as well.

Polymer layers of the present invention can have, for example and without limitation, a thickness of 0.25 to 2.0 millimeters, depending on the number of polymer layers used, with a total thickness of all polymer layers of, for example, 0.75 to 1.75 millimeters. Interlayers of the present invention can have a total thickness of, for example and without limitation, 0.76 to 1.00 millimeters. These thicknesses are particularly useful for applications requiring safety glass performance.

In other embodiments total polymer layer thickness can be less than 0.76 millimeters, or less than 0.4 mm with a minimum of 0.1 mm or thicker than 1.00 millimeter, thicker than 1.56 mm but with a maximum of 2.0 mm, depending on the application.

Additives may be incorporated into the polymer layer to enhance its performance in a final product. Such additives include, but are not limited to, the following agents: antiblocking agents, plasticizers, dyes, pigments, stabilizers (e.g., ultraviolet stabilizers), antioxidants, flame retardants, infrared absorbers, combinations of the foregoing additives, and the like.

Polymer layers and/or glass layers of the present invention can be laminated using any conventional technique. Polymer layers can be prelaminated prior to final lamination, for example, by applying sufficient heat and/or pressure to tack polymer layers and/or polymer films together. The prelaminate can then be disposed in contact with a glazing substrate and/or other polymer layers and laminated to form a laminated panel.

The surface layers of polymer films in contact with polymer layers preferably are appropriately coated and/or treated to achieve adequate adhesion and laminate integrity. Preferred techniques are roughening of the surface of the polymer film or by chemical modification of the polymer film surface. Such modification can be effected by flame treatment, chemical oxidation, corona discharge, carbon sputtering, plasma treatment in vacuum or in air, application of an adhesive, or other treatments well known to those of ordinary skill in the art.

It is often desirable to add an infrared (IR) light absorber to one or more polymer layers in order to reduce the solar energy that is transmitted through the laminate. It is known that nanoparticles of various inorganic oxides can be dispersed within a resin binder to form coatings or layers that absorb particular wavelength bands of infrared energy while allowing high levels of transmission of visible light. Antimony doped tin oxide and tin doped indium oxide can be used, for example (see U.S. Pat. Nos. 5,807,511 and 5,518,810). Lanthanum hexaboride ($LaB_6$) can also be used with inorganic oxides to provide a reduction in infrared transmission (see, for example, European Patent application EP-A-1008564).

The present invention includes multiple layer glass panels comprising any interlayers of the present invention.

The present invention includes methods of making interlayers and multiple layer glass panels comprising forming any of the interlayers and glass panels of the present invention by the methods described herein.

The present invention includes multiple layer glazing panels, and specifically multiple layer glass panels such as architectural safety glass and automobile windshields, comprising any of the interlayers of the present invention.

The present invention includes methods of manufacturing a multiple layer glass panel, comprising disposing any of the interlayers of the present invention, with or without additional polymeric layers, between two panes of glass and laminating the stack.

Also included in the present invention are stacks or rolls of any of the polymer interlayers of the present invention disclosed herein.

The present invention also includes methods of defrosting, comprising disposing a multiple layer glazing panel of the present invention in a vehicle or building, and applying a current to the micro lines.

For any embodiment given herein comprising a layer of glass, an equivalent embodiment exists, where appropriate, comprising a rigid glazing substrate other than glass. In these embodiments, the rigid substrate can comprise acrylic such as Plexiglass®, polycarbonate such as Lexan®, and other plastics that are conventionally used in glazings.

Various polymer layer and/or laminated glass characteristics and measuring techniques will now be described for use with the present invention.

The clarity of a polymer layer can be determined by measuring the haze value, which is a quantification of the light scattered by a sample in comparison to the incident light. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer layer to glass, the following technique is used to determine pummel. Two-ply glass laminate samples are prepared with standard autoclave lamination conditions. The laminates are cooled to about −17.8° C. (0° F.) and manually pummeled with a hammer to break the glass. All broken glass that is not adhered to the polymer layer is then removed, and the amount of glass left adhered to the polymer layer is visually compared with a set of standards. The standards correspond to a scale in which varying degrees of glass remain adhered to the poly(vinyl butyral) layer. In particular, at a pummel standard of zero, no glass is left adhered to the polymer layer. At a pummel standard of 10, 100% of the glass remains adhered to the polymer layer. For laminated glass panels of the present invention, various embodiments have a pummel of at least 3, at least 5, at least 8, at least 9, or 10. Other embodiments have a pummel between 8 and 10, inclusive.

The "yellowness index" of a polymer layer can be measured according to the following: transparent molded disks of polymer layer 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness. In various embodiments of the present invention, a polymer layer can have a yellowness index of 12 or less, 10 or less, or 8 or less. Transmittances can be measured using a Perkin-Elmer Lambda 900 spectrophotometer with a 150 mm diameter integrating sphere, calculated using the D65 Illuminant with 10° observer and following the ISO 9050 (air mass 2) standard.

EXAMPLES

Example 1

A comparison in heating rate is made between a laminate containing tungsten wires in the polymeric interlayer and a laminate containing a copper grid (produced by lithography).

A first laminate is formed having the configuration: glass/poly(vinyl butyral) layer (0.76 millimeters)/glass, with conventional tungsten wires stitched in the poly(vinyl butyral) layers. The distance between the wires is approximately 5 millimeters. The thickness of the wires is approximately 25 microns, and the laminate is referred to in the FIG. 1 legend as "tungsten wires."

A second laminate is formed with the following configuration: glass/poly(vinyl butyral) layer (0.38 mm)/poly(ethylene) terephthalate layer (125 microns)/poly(vinyl butyral) layer (0.38 mm)/glass, with copper micro lines formed on the poly(ethylene terephthalate) layer. The pitch between the micro lines is approximately 250 microns while the width of the micro lines is 10 microns. The open area is approximately 90.0%, and the laminate is referred to in the FIG. 1 legend as "microlines grid 1."

A third laminate has the same structure as the second laminate but with a slightly different grid layout. The pitch between the lines is increased to 300 microns, while the micro lines have a width of 11 microns. The open area is measured as approximately 89.0%. In each case the grid structure is a square, and the laminate is referred to in the FIG. 1 legend as "microlines grid 2."

The sample sizes are approximately 30 centimeters square.

In each case the glass layers are 2.1 millimeters thick.

Each laminate is connected to a 12 volt battery.

Figure 1:
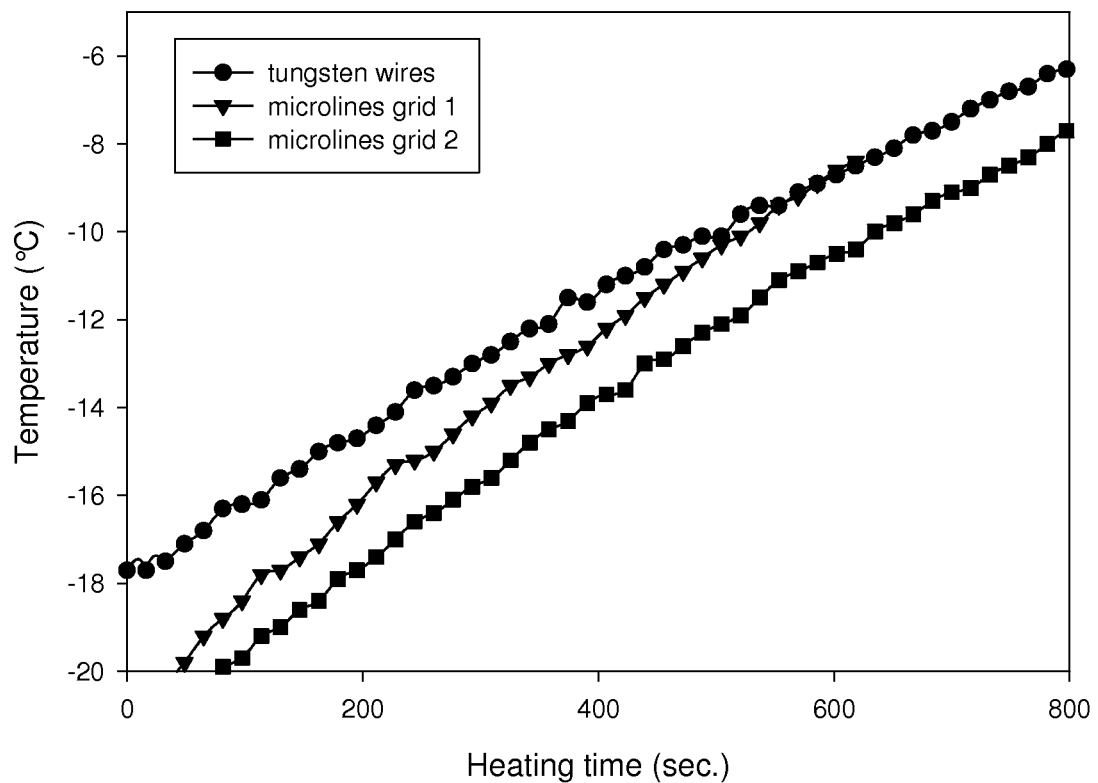
FIG. 1 represents a graph of the heating performance of laminated glass panels of the present invention in comparison with a convention laminated glass panel.

The laminates are placed in a refrigerator, and the surface temperature is monitored over time. Results are shown in FIG. 1, which shows that in case of the copper micro lines the surface temperature of the laminate increases faster than in the case of the conventional tungsten wires. In all cases the total light transmission of the laminate is greater than 75%.

Example 2

In a second example the heating rates of windshields are compared.

The first windshield is a conventional product that uses tungsten wires for heating. The thickness of the wires is approximately 25 microns.

The second windshield comprises a micro line grid structure, produced using a photographic technique. The second windshield has the structure: glass/poly(vinyl butyral) layer/poly(ethylene) terephthalate layer/poly(vinyl butyral) layer/glass, with the poly(vinyl butyral) layers each having a thickness of 0.76 millimeters. The thickness of the wires is approximately 25 microns.

The windshield are connected to a 6 volt power source, and the surface temperature of each windshield is monitored over time. Experiments are carried out at room temperature.

In case of the conventional tungsten wired product, a heating rate of 0.1° C./minute is recorded, and in the case of the micro line grid the heating rate is doubled to 0.2° C./minute. In both cases the light transmission is higher than 75%.

By virtue of the present invention, it is now possible to provide laminated glass products that employ highly functional micro lines to heat the laminated glass without unacceptably impairing the optical properties of the laminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer layer can be formed comprising poly(vinyl butyral) in any of the ranges given for molecular weight in addition to any of the ranges given for plasticizer, to form many permutations that are within the scope of the present invention.

Figures are understood to not be drawn to scale unless indicated otherwise.

Each reference, including journal articles, patents, applications, and books, referred to herein is hereby incorporated by reference in its entirety.

The invention claimed is:

1. A multiple layer glazing interlayer, comprising:
 a polymer layer comprising a polymer selected from the group consisting of: poly(vinyl butyral), polyurethane, polyvinyl chloride, poly(ethylene-co-vinyl acetate), polyethylene, polyethylene copolymers, partially neutralized ethylene/(meth)acrylic copolymers, and combinations thereof;
 a polymer film disposed in contact with said polymer layer, wherein said polymer film comprises polyethylene terephthalate and electrically conductive heated micro lines having a thickness of 5 to 25 microns;
 an input electrode; and,
 an output electrode, wherein said input electrode and said output electrode are in electrical continuity with said micro lines.

2. The glazing interlayer of claim 1, wherein said polymer layer comprises poly(vinyl butyral).

3. The glazing interlayer of claim 1, wherein said micro lines have a thickness of 5 to 15 microns.

4. The glazing interlayer of claim 1, wherein said micro lines are formed as parallel lines.

5. The glazing interlayer of claim 1, where said micro lines comprise a metal or carbon nanotubes.

6. The glazing interlayer of claim 1, wherein said micro lines are formed in a grid pattern.

7. The glazing interlayer of claim 1, wherein said polymer film has a surface resistivity of 0.050 to 5 ohms per square.

8. The glazing interlayer of claim 1, further comprising a second polymer layer disposed in contact with said polymer film.

9. The glazing interlayer of claim 1, wherein said glazing interlayer has a transparency of at least 70%.

10. A multiple layer glazing, comprising:
 two glazing panes; and,
 a multiple layer glazing interlayer disposed between said glazing panes, comprising,
  a polymer layer comprising a polymer selected from the group consisting of: polyvinyl (vinyl butyral), polyurethane, polyvinyl chloride, poly(ethylene-co-vinyl acetate), polyethylene, polyethylene copolymers, partially neutralized ethylene/(meth)acrylic copolymers, and combinations thereof;
  a polymer film disposed in contact with said polymer layer, wherein said polymer film comprises polyethylene terephthalate and electrically conductive heated micro lines having a thickness of 5 to 25 microns;
  an input electrode; and,
  an output electrode, wherein said input electrode and said output electrode are in electrical continuity with said micro lines.

11. The multiple layer glazing of claim 10, wherein said polymer layer comprises poly(vinyl butyral).

12. The multiple layer glazing of claim 10, wherein said micro lines have a thickness of 5 to 15 microns.

13. The multiple layer glazing of claim 10, wherein said micro lines are formed as parallel lines.

14. The multiple layer glazing of claim 10, where said micro lines comprise a metal or carbon nanotubes.

15. The multiple layer glazing of claim 10, wherein said micro lines are formed in a grid pattern.

16. The multiple layer glazing of claim 10, wherein said polymer film has a surface resistivity of 0.050 to 5 ohms per square.

17. The multiple layer glazing of claim 10, further comprising a second polymer layer disposed in contact with said polymer film.

18. The multiple layer glazing of claim 10, wherein said glazing interlayer has a transparency of at least 70%.

19. A method of heating a vehicle windshield, comprising:
 providing a multiple layer glazing, comprising:
  two glazing panes; and,
  a multiple layer glazing interlayer disposed between said glazing panes, comprising,
   a polymer layer comprising a polymer selected from the group consisting of: poly(vinyl butyral), polyurethane, polyvinyl chloride, poly(ethylene-co-vinyl acetate), polyethylene, polyethylene copolymers, partially neutralized ethylene/(meth)acrylic copolymers, and combinations thereof;
   a polymer film disposed in contact with said polymer layer, wherein said polymer film comprises polyethylene terephthalate and electrically conductive heated micro lines having a thickness of 5 to 25 microns;
   an input electrode; and,
   an output electrode, wherein said input electrode and said output electrode are in electrical continuity with said micro lines; and,
 applying a voltage potential across said input electrode and said output electrode.

* * * * *